United States Patent
DeRodes et al.

(10) Patent No.: US 8,015,223 B1
(45) Date of Patent: Sep. 6, 2011

(54) SYSTEM AND METHOD FOR THE TRANSLATION OF TELECOMMUNICATIONS TROUBLE TICKETS

(75) Inventors: Samuel B. DeRodes, Overland Park, KS (US); Barry K. Sutherland, Rochester, NY (US); Daniel G. Dobbs, Chilhowee, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 588 days.

(21) Appl. No.: 12/123,143

(22) Filed: May 19, 2008

(51) Int. Cl.
G06F 17/30 (2006.01)
(52) U.S. Cl. .................. 707/922; 705/304
(58) Field of Classification Search .............. 707/922; 705/304
See application file for complete search history.

(56) References Cited

U.S. PATENT DOCUMENTS

| | | | |
|---|---|---|---|
| 5,446,880 A * | 8/1995 | Balgeman et al. ............... 1/1 |
| 5,649,182 A * | 7/1997 | Reitz ................................ 1/1 |
| 6,031,895 A * | 2/2000 | Cohn et al. ................. 379/88.13 |
| 6,032,184 A * | 2/2000 | Cogger et al. ................ 709/223 |
| 6,219,648 B1 * | 4/2001 | Jones et al. .................. 705/7.39 |
| 6,763,333 B2 * | 7/2004 | Jones et al. .................. 705/7.15 |
| 7,681,245 B2 * | 3/2010 | Walker et al. .................. 726/30 |
| 2003/0154118 A1 * | 8/2003 | Druyan et al. .................... 705/8 |
| 2005/0038823 A1 * | 2/2005 | Wade et al. .................. 707/200 |
| 2009/0157903 A1 * | 6/2009 | Lewis et al. .................. 709/246 |

* cited by examiner

Primary Examiner — Cheyne D Ly

(57) ABSTRACT

A computer system is configured to translate telecommunications trouble tickets. The computer system receives a native telecommunications trouble ticket from a first telecommunications trouble ticket system, and translates the native telecommunications trouble ticket into a master telecommunications trouble ticket. The computer system then stores first data from the native telecommunications trouble ticket in a database, and retrieves second data related to the native telecommunications trouble ticket from the database. Next, the computer system merges at least some of the second data into the master telecommunications trouble ticket, translates the master ticket into a first enhanced telecommunications trouble ticket configured for use by the first telecommunications trouble ticket system, and sends the first enhanced telecommunications trouble ticket to the first telecommunications trouble ticket system.

20 Claims, 9 Drawing Sheets

SYSTEM AND METHOD FOR THE TRANSLATION OF TELECOMMUNICATIONS TROUBLE TICKETS

TECHNICAL BACKGROUND

Modern telecommunications systems are extremely complex and contain a wide variety of subsystems. For example, a telecommunications system may include subsystems configured for wireless voice communication, wireless data communication, Voice over Internet Protocol (VOIP) communication, billing, and service. Each of these subsystems may include a system for creating, modifying, closing, and tracking trouble tickets. For example when a wireless voice customer is unable to complete a call to a destination device, they may call the service center for wireless voice communications. This service center may then open a telecommunications trouble ticket containing information describing the problem so that technicians may work to repair the problem.

Some problems may involve more than one subsystem within the telecommunications system. For example, in the case of the wireless voice customer discussed above, it may be advantageous to know the billing and payment history of the customer, along with information regarding previous complaints from the customer. Often this additional data is not contained within the wireless voice subsystem, and technicians must query other service centers within other subsystems in order to generate a complete picture of the problem.

Also, some problems may span two or more subsystems due to the type of problem that has occurred. For example, if the wireless voice customer is unable to call a destination device on the Public Switched Telephone Network (PSTN), the problem could potentially be located within the PSTN, not the wireless voice subsystem. In such a case, technicians for the wireless voice subsystem would be unable to solve the problem, and would need to alert technicians responsible for the PSTN about the problem.

OVERVIEW

In various embodiments, methods, systems, and software are provided to translate telecommunications trouble tickets. In an embodiment, a method executed by a computer system for the translation of telecommunications trouble tickets comprises receiving a native telecommunications trouble ticket from a first telecommunications trouble ticket system, and translating the native telecommunications trouble ticket into a master telecommunications trouble ticket. The computer system then stores first data from the native telecommunications trouble ticket in a database, retrieves second data related to the native telecommunications trouble ticket from the database, and merges at least some of the second data into the master telecommunications trouble ticket. Next, the computer system translates the master ticket into a first enhanced telecommunications trouble ticket configured for use by the first telecommunications trouble ticket system, and sends the first enhanced telecommunications trouble ticket to the first telecommunications trouble ticket system.

In another embodiment, a computer system comprises a storage system containing software and a database and a processing system coupled to the storage system. The processing system is instructed by the software to receive a native telecommunications trouble ticket from a first telecommunications trouble ticket system, and translate the native telecommunications trouble ticket into a master telecommunications trouble ticket. The processing system is further instructed by the software to store first data from the native telecommunications trouble ticket in the database, retrieve second data related to the native telecommunications trouble ticket from the database, and merge at least some of the second data into the master telecommunications trouble ticket. The processing system is also instructed by the software to translate the master telecommunications trouble ticket into a first enhanced telecommunications trouble ticket configured for use by the first telecommunications trouble ticket system, and send the first enhanced telecommunications trouble ticket to the first telecommunications trouble ticket system.

In a further embodiment, a computer-readable medium having instructions stored thereon for operating a computer system is provided. When the instructions are executed by the computer system, they direct the computer system to receive a native telecommunications trouble ticket from a first telecommunications trouble ticket system, and translate the native telecommunications trouble ticket into a master telecommunications trouble ticket. The instructions further direct the computer system to store first data from the native telecommunications trouble ticket in a database, retrieve second data related to the native telecommunications trouble ticket from the database, and merge at least some of the data retrieved from the database into the master telecommunications trouble ticket. The instructions also direct the computer system to translate the master telecommunications trouble ticket into a first enhanced telecommunications trouble ticket configured for use by the first telecommunications trouble ticket system, and send the first enhanced telecommunications trouble ticket to the first telecommunications trouble ticket system.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
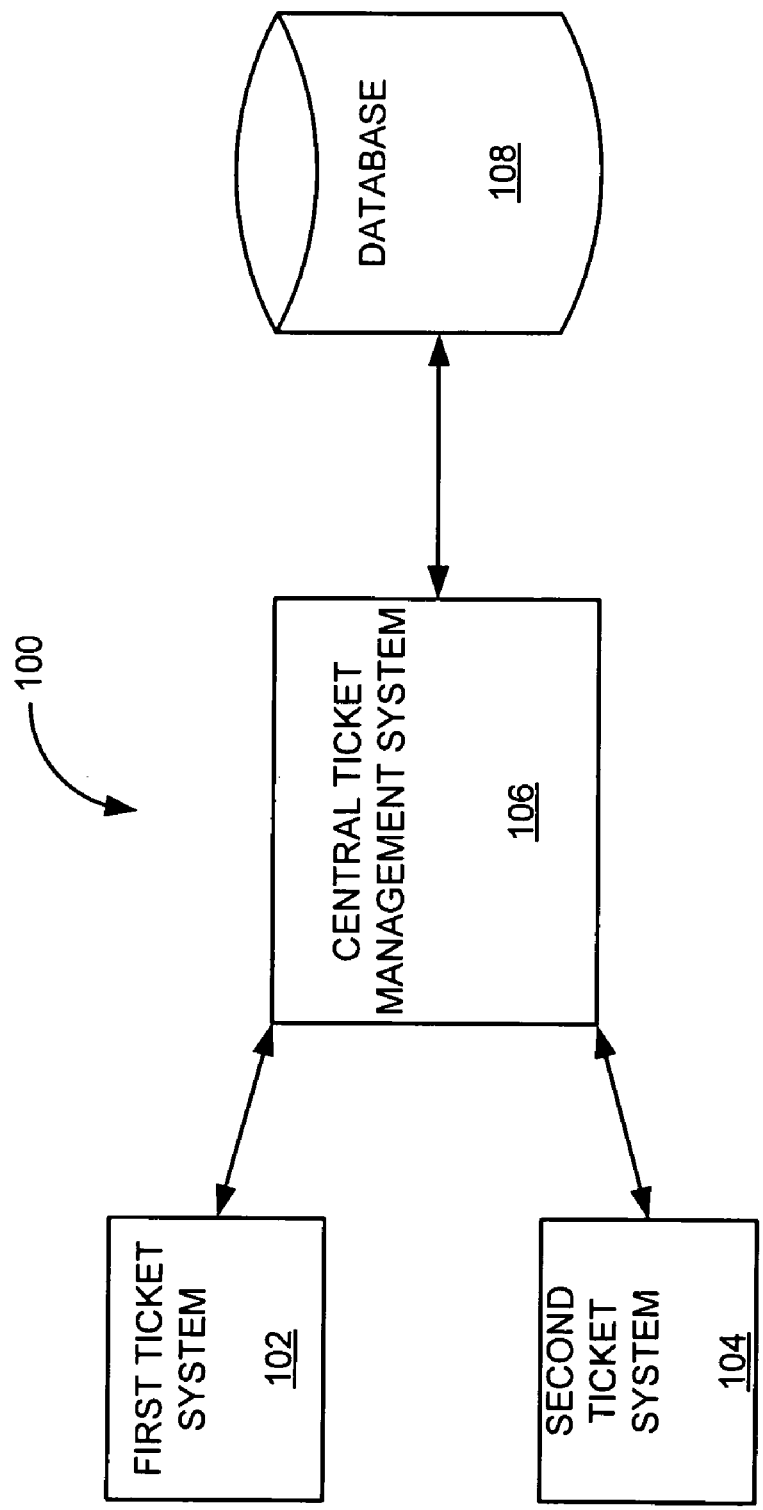
FIG. 1 is a block diagram illustrating a telecommunications trouble ticket management system.

FIG. 1 is a block diagram illustrating a telecommunications trouble ticket management system 100. In this example, a telecommunications trouble ticket management system 100 includes first telecommunications trouble ticket system 102, second telecommunications trouble ticket system 104, central telecommunications trouble ticket management system 106, and database 108. The first and second telecommunications trouble ticket systems 102 and 104 are communicatively coupled with central telecommunications trouble ticket management system 106, which in turn is communicatively coupled with database 108. In this example, first and second telecommunications trouble ticket systems 102 and 104 support different parts of a telecommunications system. For example, first telecommunications trouble ticket system 102 may support a wireless data network while second telecommunications trouble ticket system 104 may support a billing system for the telecommunications system. Often these two ticket systems are provided by different suppliers, and their trouble tickets are incompatible.

When a problem arises, a native telecommunications trouble ticket is created by one of the trouble ticket systems. This native ticket is sent to central ticket management system 106 where it is translated into a master telecommunications trouble ticket. This master ticket contains information from the native ticket and includes data fields for other information in addition to the information from the native ticket. For example, the native ticket from first telecommunications trouble ticket system 102 may include only the customer's name and account number as customer information, while the master ticket may include fields for the customer's address, credit history, and billing history in addition to the name and account number. These fields may be populated from database 108. In this example, central ticket management system 106 sends first data from the native ticket to database 108. Central ticket management system 106 then reads second data related to the native ticket from database 108 and merges at least some of this second data into the master ticket. This enables central ticket management system 106 to populate additional fields in the master ticket without requiring first ticket system 102 to request additional information from the customer.

Additionally, central ticket management system 106 translates the master ticket into a first enhanced telecommunications trouble ticket and sends the first enhanced ticket to first ticket system 102. This first enhanced telecommunications trouble ticket contains information from the master ticket and includes additional information not present in the native ticket. Continuing the example above, this first enhanced ticket may include the customer's address in addition to the customer information from the native ticket. This provides first ticket system 102 additional information useful in solving the problem. In some cases, first ticket system 102 may be configured to only accept trouble tickets having a limited number of fields. In this case, additional information from the master ticket may be included in a comments field within the first enhanced ticket, so that technicians at first ticket system 102 have access to this additional information, even though the ticket format does not include specific fields for the additional information.

Further, central ticket management system 106 may translate the master ticket into a second enhanced telecommunications trouble ticket configured for use by second telecommunications trouble ticket system 104, and send the second enhanced telecommunications trouble ticket to second telecommunications trouble ticket system 104. This allows second ticket system 104 to work on the problem in parallel with first ticket system 102, resulting in a more efficient problem solution. This second enhanced telecommunications trouble ticket may have a completely different format from the first enhanced telecommunications trouble ticket. In some embodiments, the second enhanced telecommunications trouble ticket may be in a completely different language than the native telecommunications trouble ticket. For example, if the wireless data system and first telecommunications trouble ticket system are in the United States, the native telecommunications trouble ticket will most likely be in English. If the billing system is in India, the second enhanced telecommunications trouble ticket will be translated from English to Hindi for use within second telecommunications trouble ticket system 104.

Figure 2:
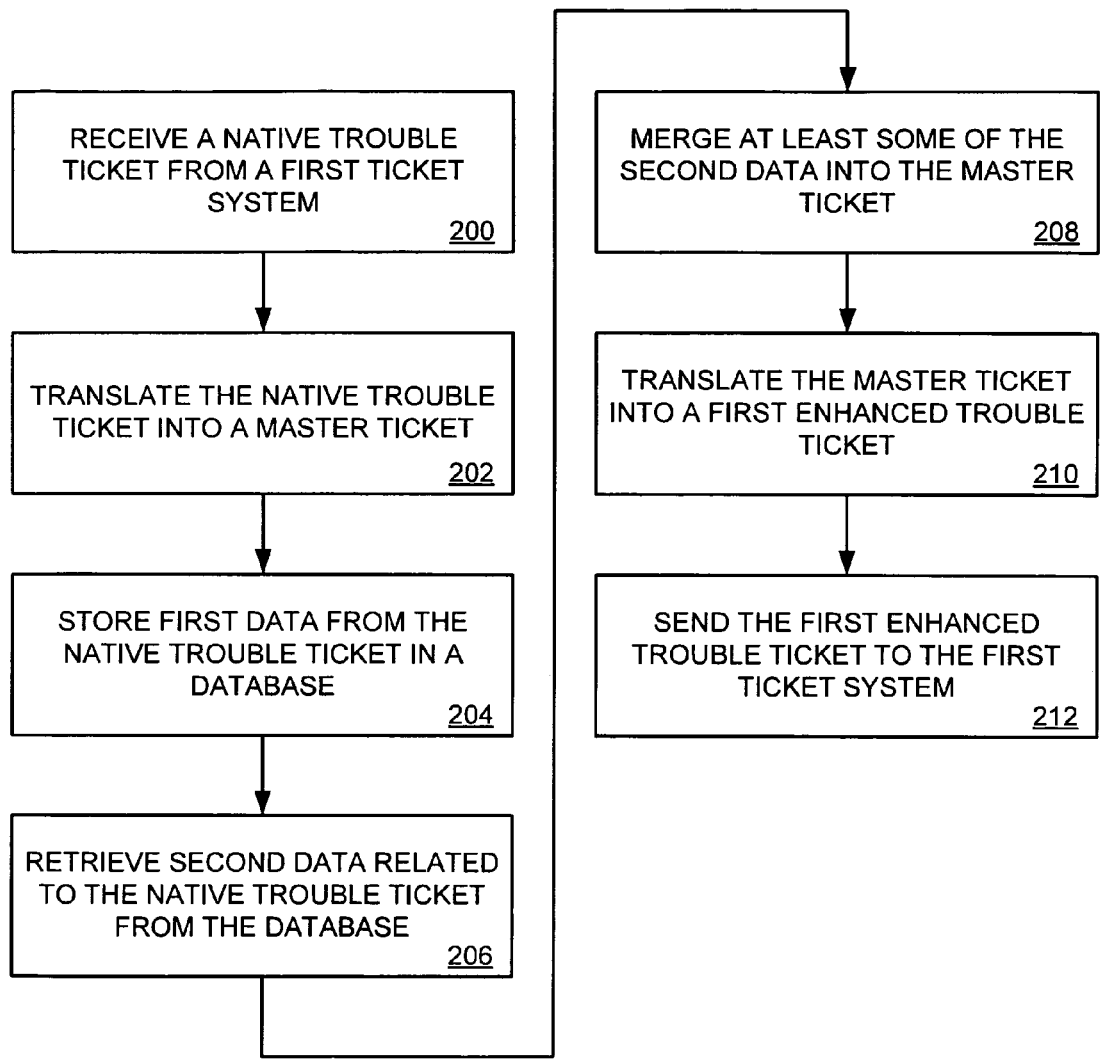
FIG. 2 is a flow diagram illustrating a method for operating a computer system for the translation of telecommunications trouble tickets.

FIG. 2 is a flow diagram illustrating a method for operating a computer system for the translation of telecommunications trouble tickets. Reference numbers for FIG. 2 are indicated parenthetically below. Central telecommunications trouble ticket management system 106 receives a native telecommunications trouble ticket from first telecommunications trouble ticket system 102, (operation 200). Central telecommunications trouble ticket management system 106 translates the native telecommunications trouble ticket into a master telecommunications trouble ticket, (operation 202).

Central telecommunications trouble ticket management system 106 stores first data from the native telecommunications trouble ticket into database 108, (operation 204). This first data may include some or all of the data contained in the native telecommunications trouble ticket. Central telecommunications trouble ticket management system 106 retrieves second data related to the native telecommunications trouble ticket from database 108, (operation 206). This second data may include additional information related to the native ticket such as billing records, location records, service records, and the like. The data included in database 108 may include data provided by any other subsystem within the entire telecommunications system. For example, the database 108 may include customer information from a billing subsystem, equipment status information from a wireless voice network subsystem, and any other data provided from any of the subsystems within the telecommunications system. Any or all of this data may then be included in the master ticket and translated into any number of enhanced telecommunications trouble tickets.

Central telecommunications trouble ticket management system 106 then merges at least some of the second data into the master telecommunications trouble ticket, (operation 208). Central telecommunications trouble ticket management system 106 then translates the master ticket into a first enhanced telecommunication trouble ticket configured for use by first telecommunications trouble ticket system 102, (operation 210), and then sends the first enhanced telecommunication trouble ticket to first telecommunications trouble ticket system 102, (operation 212).

Figure 3:
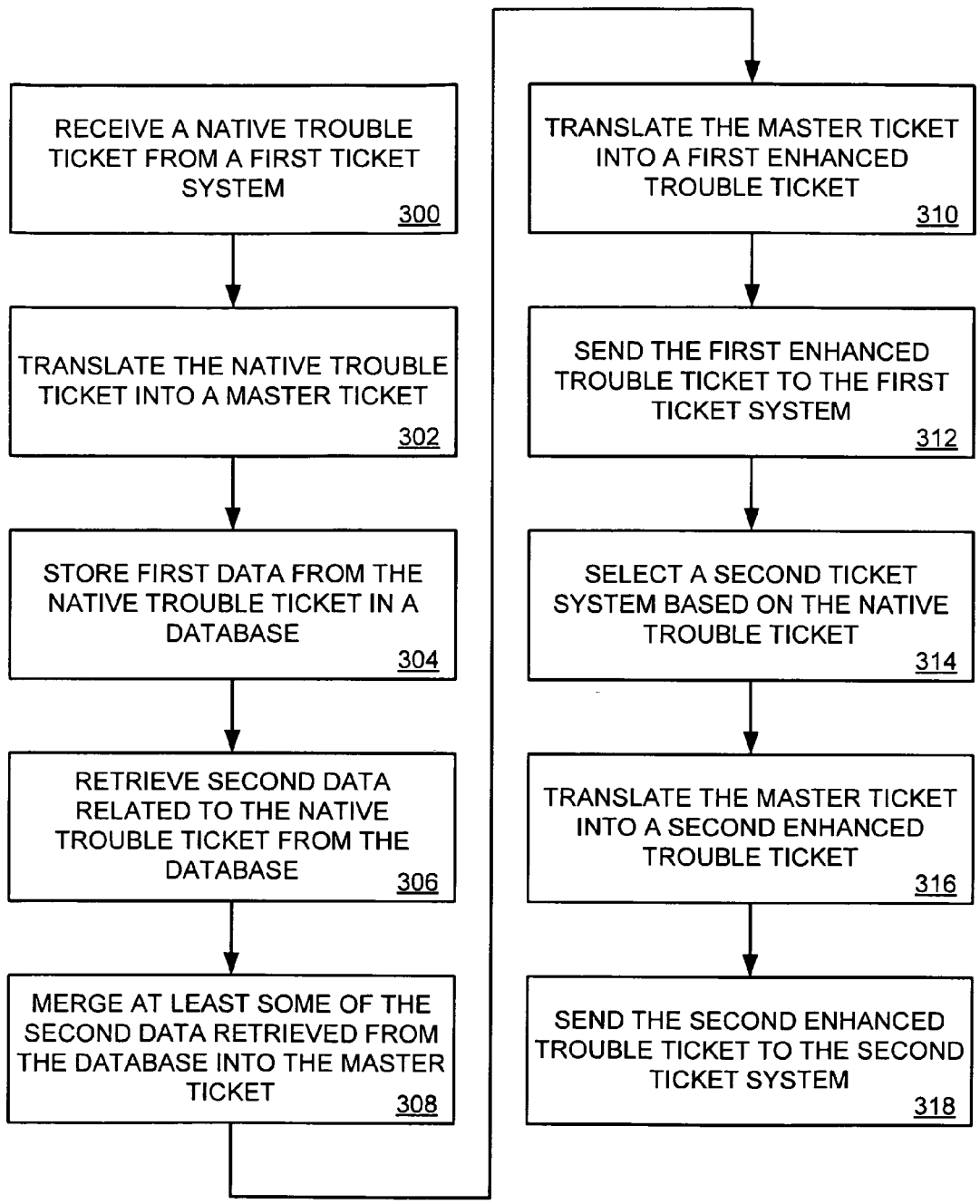
FIG. 3 is a flow diagram illustrating a method for operating a computer system for the translation of telecommunications trouble tickets.

FIG. 3 is a flow diagram illustrating a method for operating a computer system for the translation of telecommunications trouble tickets. Reference numbers for FIG. 3 are indicated parenthetically below. Central telecommunications trouble ticket management system 106 receives a native telecommunications trouble ticket from first telecommunications trouble ticket system 102, (operation 300). Central telecommunications trouble ticket management system 106 translates the native telecommunications trouble ticket into a master telecommunications trouble ticket, (operation 302).

Central telecommunications trouble ticket management system 106 stores first data from the native telecommunications trouble ticket into database 108, (operation 304). This first data includes at least some of the data contained in the native telecommunications trouble ticket. Central telecommunications trouble ticket management system 106 retrieves second data related to the native telecommunications trouble ticket from database 108, (operation 306). This second data may include additional information related to the native ticket such as billing records, location records, service records, and the like.

Central telecommunications trouble ticket management system 106 then merges at least some of the second data into the master telecommunications trouble ticket, (operation 308). Central telecommunications trouble ticket management system 106 then translates the master ticket into a first enhanced telecommunications trouble ticket configured for use by first telecommunications trouble ticket system 102, (operation 310), and then sends the first enhanced telecommunications trouble ticket to first telecommunications trouble ticket system 102, (operation 312).

Central telecommunications trouble ticket management system 106 then selects a second telecommunications trouble ticket system 104 based on the native telecommunications trouble ticket, (operation 314). Information included in the native telecommunications trouble ticket may suggest one or more additional systems that may be related to the trouble ticket. For example, a destination telephone number for a wireless telephone within the native ticket may indicate that a trouble ticket should be opened in the destination wireless voice network trouble ticket system. Central telecommunications trouble ticket management system 106 then translates the master ticket into a second enhanced telecommunications trouble ticket configured for use by second telecommunications trouble ticket system 104, (operation 316), and then sends the second enhanced telecommunications trouble ticket to second telecommunications trouble ticket system 104, (operation 318).

Figure 4:
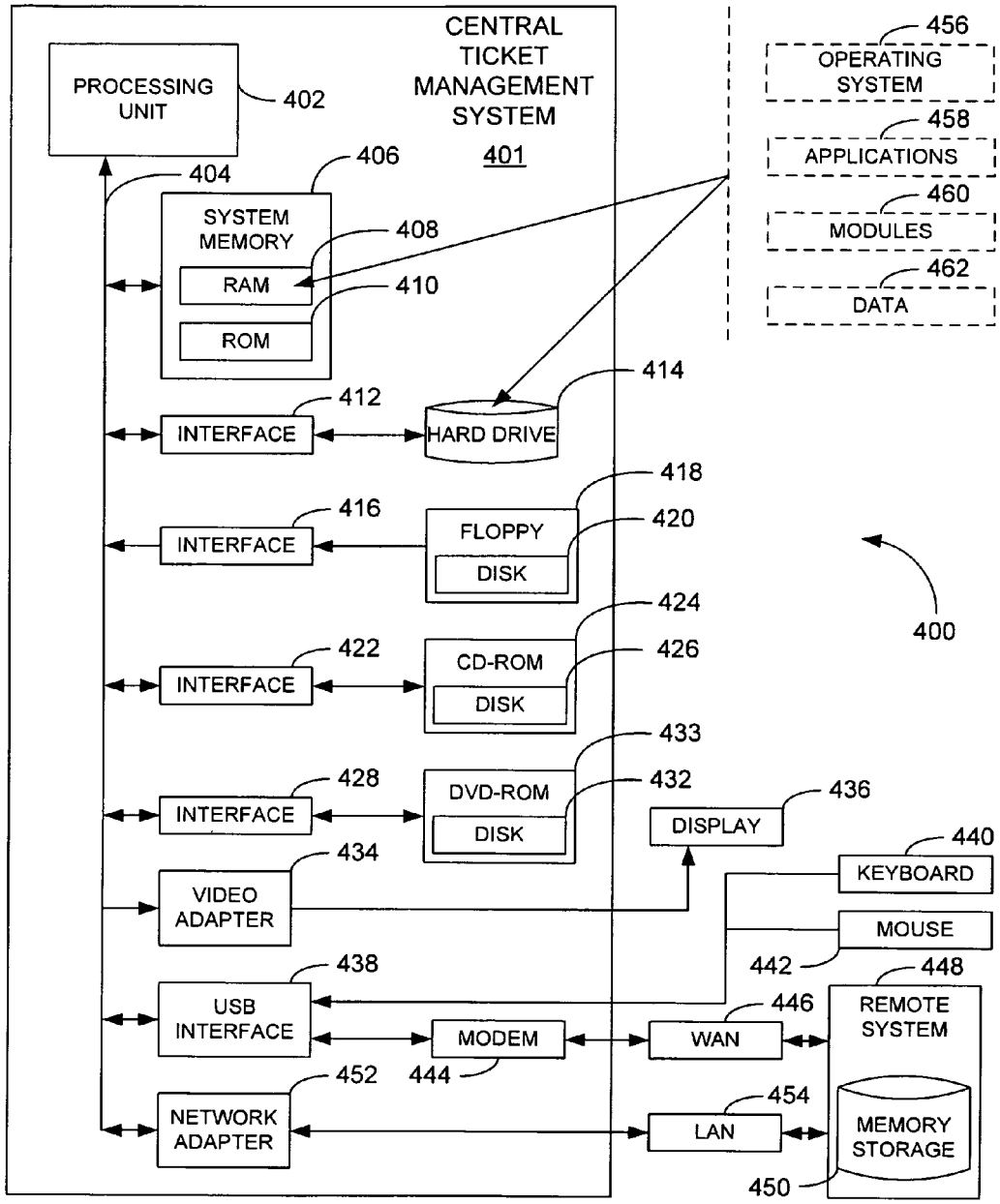
FIG. 4 is a block diagram illustrating a computer system including a central ticket management system configured to operate as a trouble ticket management system.

The methods, systems, devices, processors, equipment, and servers described above may be implemented with, contain, or be executed by one or more computer systems. The methods described above may also be stored on a computer readable medium for execution by a computer system. Many of the elements of telecommunications trouble ticket translation system 100 may be, comprise, or include computer systems. This includes, but is not limited to first ticket system 102, second ticket system 104, central ticket management system 106, and database 108. These computer systems are illustrated, by way of example, in FIG. 4. One exemplary computer system is illustrated in FIG. 4. However, other computer systems may be used for any of these system elements.

Figure 5:
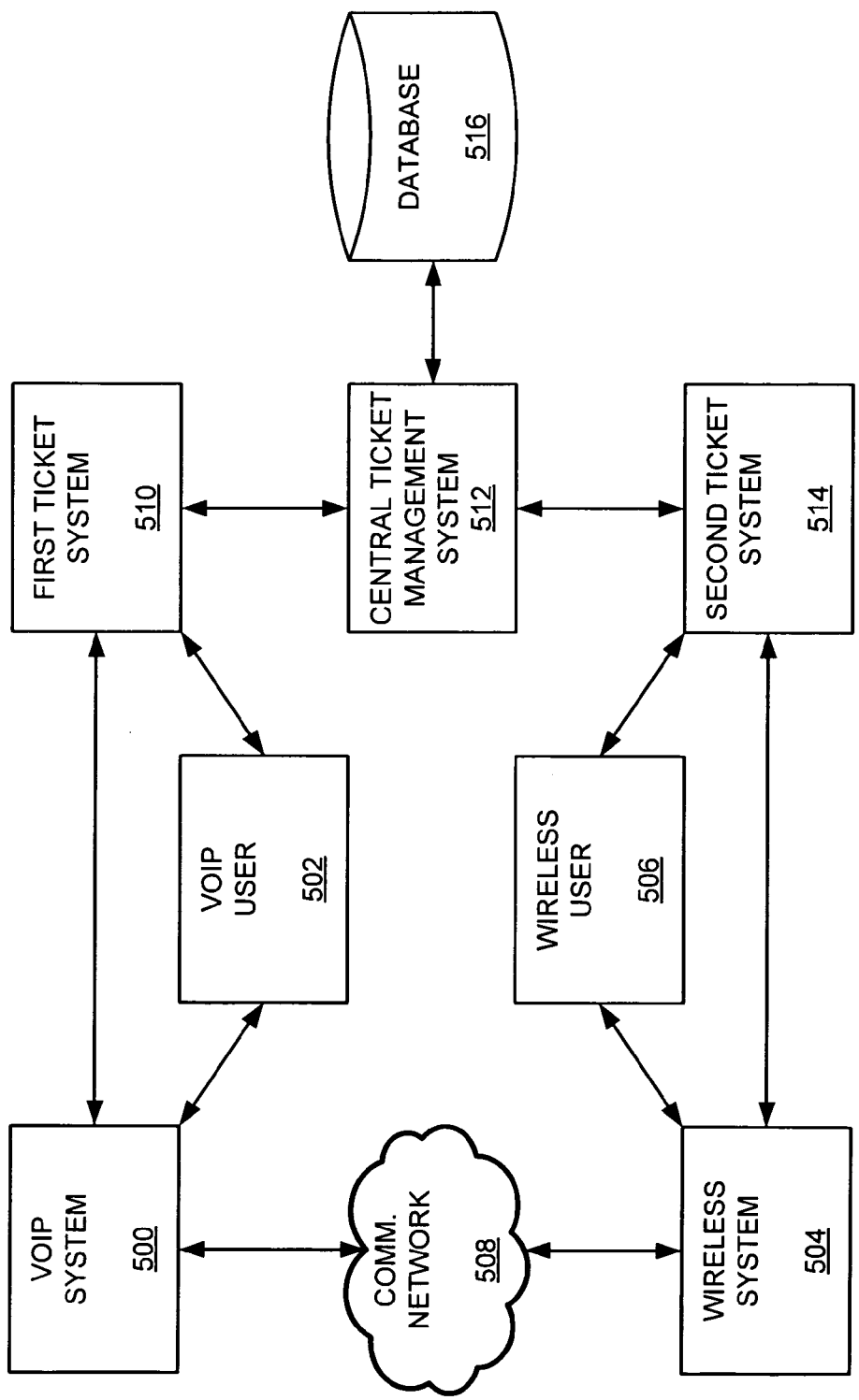
FIG. 5 is a block diagram illustrating a telecommunications trouble ticket management system.

FIG. 4 is a block diagram illustrating a computer system 400 including a computer configured to operate as an example central ticket management system 401, such as that illustrated in FIGS. 1 and 5. Any of a very wide variety of other computer structures may be used to implement the central ticket management system, and FIG. 4 is provided for exemplary purposes only. Computer system 400 includes central ticket management system 401 which in turn includes processing unit 402, system memory 406, and system bus 404 that couples various system components including system memory 406 to processing unit 402. Processing unit 402 may be any of a wide variety of processors or logic circuits, including the Intel X86 series, Pentium, Itanium, and other devices from a wide variety of vendors. Processing unit 402 may include a single processor, a dual-core processor, a quad-core processor or any other configuration of processors, all within the scope of the present invention. Central ticket management system 401 could be comprised of a programmed general-purpose computer, although those skilled in the art will appreciate that programmable or special purpose circuitry and equipment may be used. Computer system 400 may be distributed among multiple devices that together comprise elements 402-462.

There are a wide variety of system bus 404 architectures, such as PCI, VESA, Microchannel, ISA, and EISA, available for use within central ticket management system 401, and in some embodiments multiple system buses may be used within central ticket management system 401. System memory 406 includes random access memory (RAM) 408, and read only memory (ROM) 410. System ROM 410 may include a basic input/output system (BIOS), which contains low-level routines used in transferring data between different elements within the computer, particularly during start-up of the computer. System memory 406 can include any one or combination of volatile memory elements (e.g., random access memory (RAM, such as DRAM, SRAM, SDRAM, etc.)) and nonvolatile memory elements (e.g., ROM, hard drive, tape, CD-ROM, etc.). Moreover, system memory 406 may incorporate electronic, magnetic, optical, and/or other types of storage media. Note that system memory 406 can have a distributed architecture, where various components are situated remote from one another, but can be accessed by processing unit 402.

Processing unit 402 receives software instructions from system memory 406 or other storage elements and executes these instructions directing processing unit 402 to operate in a method as described herein. These software instructions may include operating system 456, applications 458, modules 460, utilities, drivers, networking software, and data 462. Software may comprise firmware, or some other form of machine-readable processing instructions.

Central ticket management system 401 also includes hard drive 414 coupled to system bus 404 through hard drive interface 412, floppy drive 418 containing floppy disk 420 coupled to system bus 404 through floppy drive interface 416, CD-ROM drive 424 containing CD-ROM disk 426 coupled to system bus 404 through CD-ROM drive interface 422, and DVD-ROM drive 433 containing DVD-ROM disk 432 coupled to system bus 404 through DVD-ROM drive interface 428. There are a wide variety of other storage elements, such as flash memory cards and tape drives, available for inclusion in central ticket management system 401, which may be coupled to system bus 404 through a wide variety of interfaces. Also, these storage elements may be distributed among multiple devices, as shown here, and also may situated remote from each other, but can be accessed by processing unit 402.

Central ticket management system 401 also includes video adapter 434 configured to drive display 436, and universal serial bus (USB) interface 438 configured to receive user inputs from keyboard 440 and mouse 442. Other user interfaces could comprise a voice recognition interface, microphone and speakers, graphical display, touch screen, game pad, scanner, printer, or some other type of user device. These user interfaces may be distributed among multiple user devices. USB interface 438 is also configured to interface with modem 444 allowing communication with remote system 448 through a wide area network (WAN) 446, such as the internet. USB interface 438 and network adapter 452 may be configured to operate as output ports capable of sending first data to a database and as input ports to receive second data from the database. In some embodiments, the database may comprise one or more storage elements such as hard drives, CD-ROM drives, DVD-ROM drives or other storage elements. These storage elements may be geographically diverse from each other, while still comprising a database configured for access by central ticket management system 401. Other embodiments may be configured to include a database within central ticket management system 401 in an internal storage element such as hard drive 414, CD-ROM drive 424, DVD-ROM drive 433, or other internal storage elements.

Central ticket management system 401 further includes network adapter 452 configured to communicate to remote system 448 through a local area network (LAN) 445. There are a wide variety of network adapters 452 and network configurations available to allow communication with remote systems 448, and any may be used in other embodiments. For example, networks may include Ethernet connections or wireless connections. Networks may be local to a single office or site, or may be as broad and inclusive as the Internet or Usenet. Remote systems 448 may include memory storage 450 in a very wide variety of configurations.

FIG. 5 is a block diagram illustrating a telecommunications trouble ticket management system. In this example, Voice over Internet Protocol (VOIP) user 502 is attempting to communicate with wireless user 506 through VOIP system 500, communication network 508, and wireless system 504. If a failure occurs in wireless system 504, VOIP user 502 is unable to contact wireless user 506 and reports the problem to first telecommunications trouble ticket system 510, which is responsible for VOIP system 500. First telecommunications trouble ticket system 510 opens a native telecommunications trouble ticket for VOIP user 502's problem. However, since the problem is actually in wireless system 504, not in VOIP system 500, the problem cannot be solved by first ticket system 510.

First telecommunications trouble ticket system 510 sends the native telecommunications trouble ticket to central telecommunications trouble ticket management system 512, which translates the native ticket to a master ticket. First data from the native telecommunications trouble ticket is stored in database 516, second data related to the native telecommunications trouble ticket is retrieved from database 516, and at least some of the second data is merged into the master ticket. For example, the base station associated with the telephone number for wireless user 506 could be out of service due to maintenance, a power outage, or a weather event. This base station status could then be included in database 516. When central telecommunications trouble ticket management system 512 retrieves the second data from database 516, this status information about the base station could be included. When central ticket management system 512 creates the enhanced trouble ticket, it could include this base station status information in the enhanced trouble ticket. If the enhanced trouble ticket does not include a specific field for this information, it could be included in a comments field so that technicians at first telecommunications trouble ticket system 510 would be able to inform the user of the problem, and would not waste their time attempting to solve the problem, since it is occurring in a different system.

Central telecommunications trouble ticket management system 512 then translates the master ticket into a second enhanced telecommunications trouble ticket configured for use by second telecommunications trouble ticket system 514, and sends the second enhanced telecommunications trouble ticket to second telecommunications trouble ticket system 514. Since second telecommunications trouble ticket system 514 is responsible for wireless system 504, it is able to solve the problem that generated the native telecommunications trouble ticket.

After first and second enhanced telecommunications trouble tickets have been generated and sent to first and second telecommunications trouble ticket systems, instructions to modify or close these tickets may be received from either the first or second telecommunications trouble ticket system. These instructions must then be propagated to the other ticket systems involved with this trouble ticket so that they may be updated. FIGS. 6 through 9 illustrate example methods for this propagation of modify and close ticket instructions.

Figure 6:
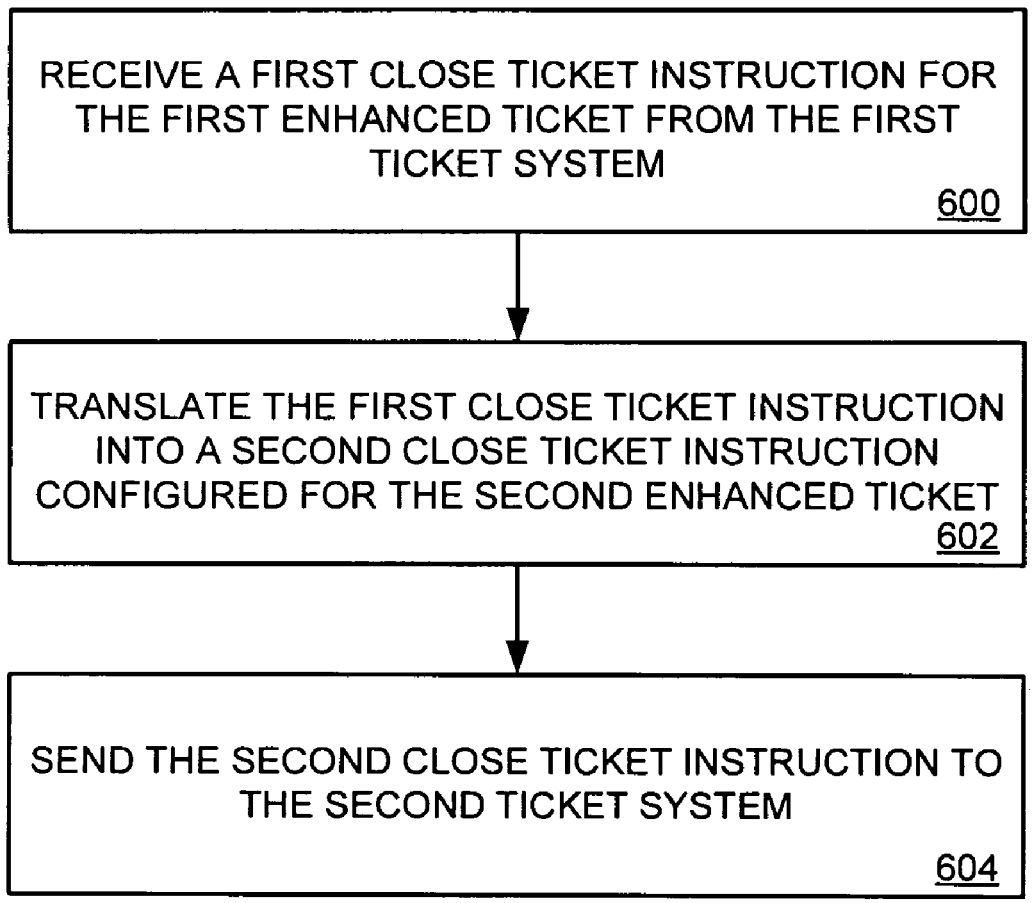
FIG. 6 is a flow diagram illustrating a method for operating a computer system for the translation of telecommunications trouble tickets.

FIG. 6 is a flow diagram illustrating a method for operating a computer system for the translation of telecommunications trouble tickets. Reference numbers from FIG. 6 are indicated parenthetically below. In this example method, central telecommunications trouble ticket management system 106 receives a first close ticket instruction for the first enhanced telecommunications trouble ticket from first telecommunications trouble ticket system 102, (operation 600). Typically tickets are opened, and resources allocated to solve the problem. When a ticket is closed, it is inactive, so that technicians know that the problem has been solved, and they no longer need to work on the problem. Information from the trouble ticket system that solved the problem could be included in the close ticket instruction, so that technicians at other trouble ticket systems would be informed of the results, and could pass this information along to users. Central telecommunications trouble ticket management system 106 translates the first close ticket instruction into a second close ticket instruction configured for the second telecommunications trouble ticket system 104, (operation 602). Central telecommunications trouble ticket management system 106 then sends the second close ticket instruction to second telecommunications trouble ticket system 104, (operation 604).

Figure 7:
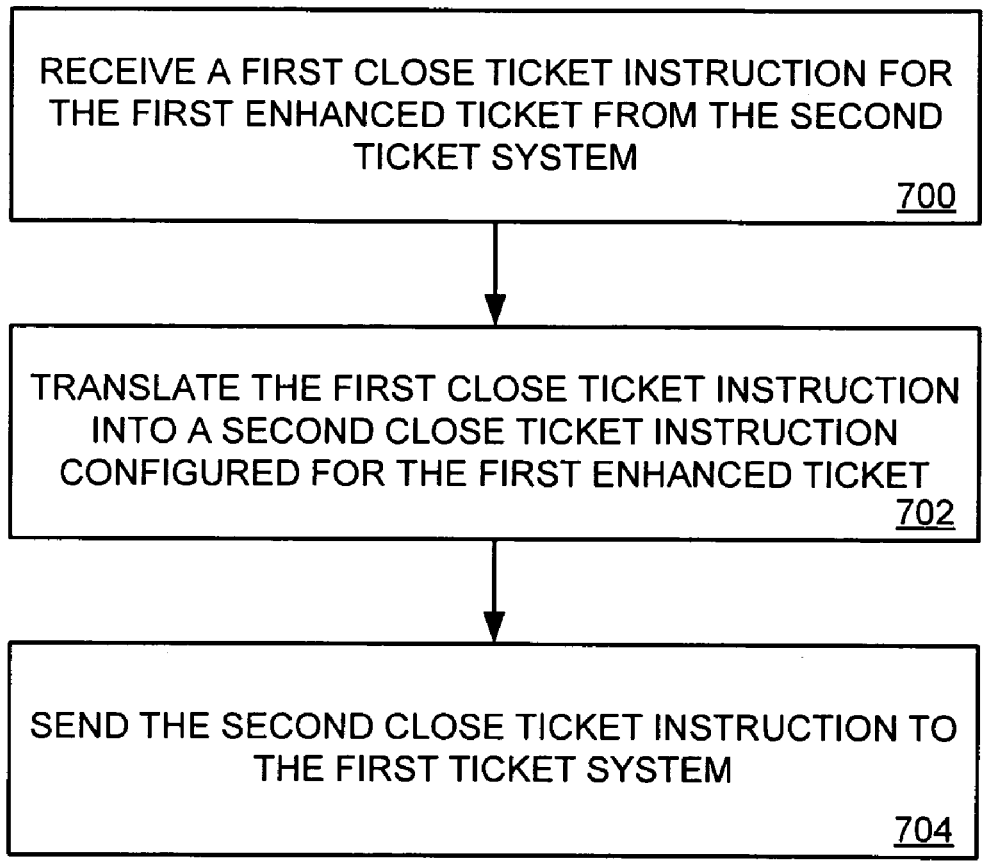
FIG. 7 is a flow diagram illustrating a method for operating a computer system for the translation of telecommunications trouble tickets.

FIG. 7 is a flow diagram illustrating a method for operating a computer system for the translation of telecommunications trouble tickets. Reference numbers from FIG. 7 are indicated parenthetically below. In this example method, central telecommunications trouble ticket management system 106 receives a first close ticket instruction for the first enhanced telecommunications trouble ticket from second telecommunications trouble ticket system 104, (operation 700). Central telecommunications trouble ticket management system 106 translates the first close ticket instruction into a second close ticket instruction configured for the first telecommunications trouble ticket system 102, (operation 702). Central telecommunications trouble ticket management system 106 then sends the second close ticket instruction to first telecommunications trouble ticket system 102, (operation 704).

Figure 8:
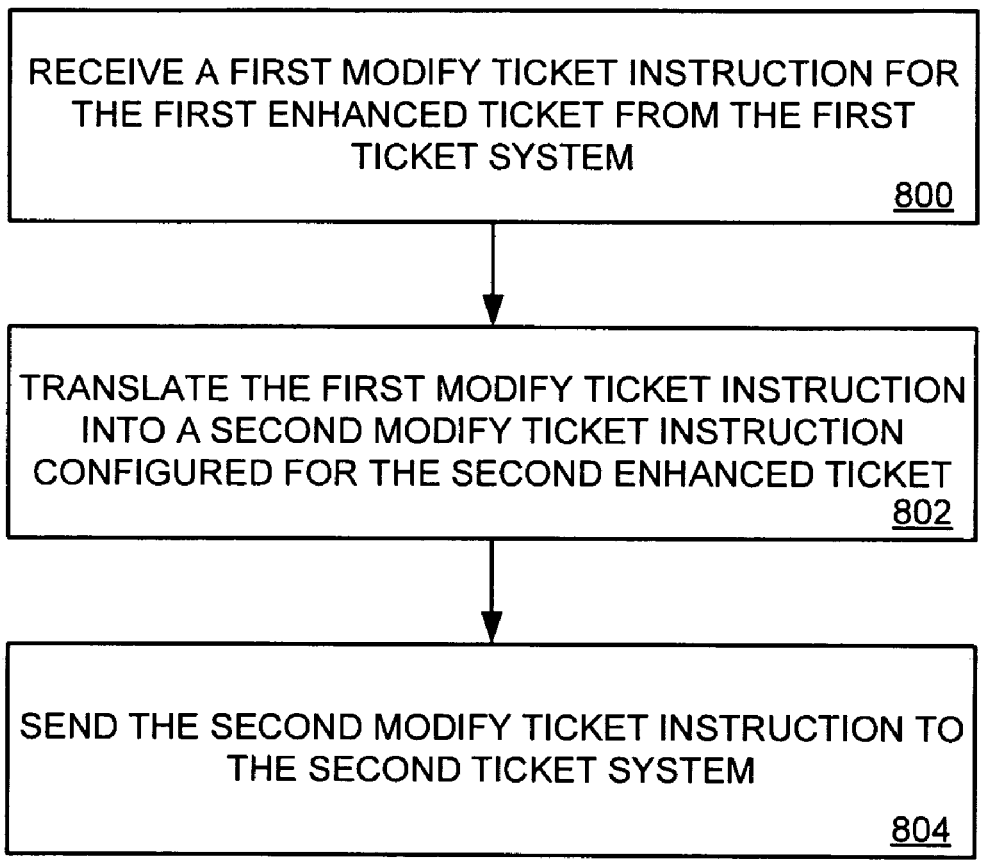
FIG. 8 is a flow diagram illustrating a method for operating a computer system for the translation of telecommunications trouble tickets.

FIG. 8 is a flow diagram illustrating a method for operating a computer system for the translation of telecommunications trouble tickets. Reference numbers from FIG. 8 are indicated parenthetically below. In this example method, central telecommunications trouble ticket management system 106 receives a first modify ticket instruction for the first enhanced telecommunications trouble ticket from first telecommunications trouble ticket system 102, (operation 800). A modify instruction is a change to an existing ticket adding or deleting data. For example, there may be a trouble ticket in a wireless system for a problem, and then technicians discover that a base station has a faulty antenna. The trouble ticket system for the wireless system could send a modify ticket instruction to the ticket management system including identification of the base station. The ticket management system could then search for trouble tickets related to that base station and add the information regarding the faulty antenna to each of the enhanced trouble tickets using a modify ticket instruction. This modify ticket instruction allows technicians at other trouble ticket systems to stop working on the problem since it has been located and work has begun by wireless system technicians. Central telecommunications trouble ticket management system 106 translates the first modify ticket instruction into a second modify ticket instruction configured for the second telecommunications trouble ticket system 104, (operation 802). Central telecommunications trouble ticket management system 106 then sends the second modify ticket instruction to second telecommunications trouble ticket system 104, (operation 804).

Figure 9:
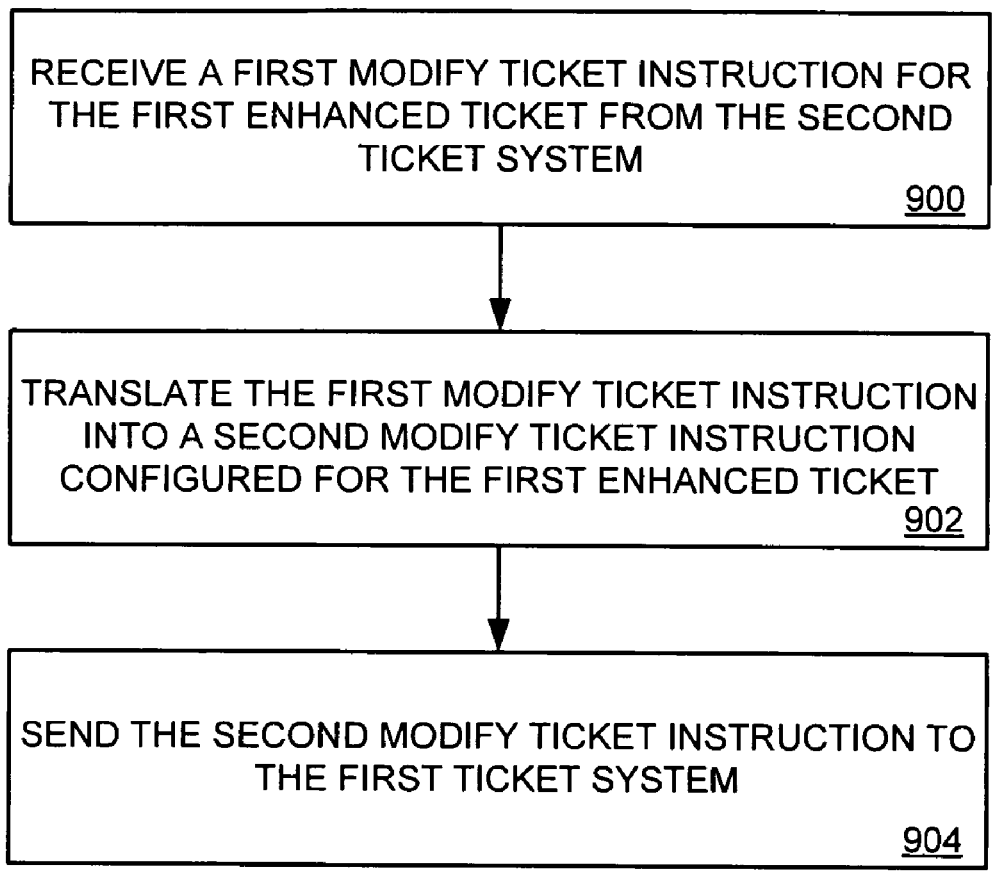
FIG. 9 is a flow diagram illustrating a method for operating a computer system for the translation of telecommunications trouble tickets.

FIG. 9 is a flow diagram illustrating a method for operating a computer system for the translation of telecommunications trouble tickets. Reference numbers from FIG. 9 are indicated parenthetically below. In this example method, central telecommunications trouble ticket management system 106 receives a first modify ticket instruction for the first enhanced telecommunications trouble ticket from second telecommunications trouble ticket system 104, (operation 900). Central telecommunications trouble ticket management system 106 translates the first modify ticket instruction into a second modify ticket instruction configured for the first telecommunications trouble ticket system 102, (operation 902). Central telecommunications trouble ticket management system 106 then sends the second modify ticket instruction to first telecommunications trouble ticket system 102, (operation 904).

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CD-ROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for operating a computer system for the translation of telecommunications trouble tickets comprising:
    receiving a native telecommunications trouble ticket, which includes information concerning a problem that occurred for a user of a telecommunications system, from a first telecommunications trouble ticket system;
    translating the native telecommunications trouble ticket into a master telecommunications trouble ticket comprising additional data fields for other information in addition to the information from the native telecommunications trouble ticket;
    storing first data, which includes at least some of the information from the native telecommunications trouble ticket, in a database;
    retrieving second data, which includes additional information related to the native telecommunications trouble ticket, from the database;
    merging at least some of the second data into the master telecommunications trouble ticket comprising populating the additional data fields with the additional information retrieved from the second data;
    translating the master ticket into a first enhanced telecommunications trouble ticket that includes the information from the native telecommunications trouble ticket and the additional information from the second data configured for use by the first telecommunications trouble ticket system; and
    sending the first enhanced telecommunications trouble ticket to the first telecommunications trouble ticket system.

2. The method for operating a computer system for the translation of telecommunications trouble tickets of claim 1, further comprising:
    selecting a second telecommunications trouble ticket system based on the native telecommunications trouble ticket;
    translating the master telecommunications trouble ticket into a second enhanced telecommunications trouble ticket configured for use by the second telecommunications trouble ticket system; and
    sending the second enhanced telecommunications trouble ticket to the second telecommunications trouble ticket system.

3. The method for operating a computer system for the translation of telecommunications trouble tickets of claim 2,
wherein the native telecommunications trouble ticket is in a first language; and
wherein translating the master telecommunications trouble ticket into a second enhanced telecommunications trouble ticket includes translating data from the master telecommunications trouble ticket in the first language into a second language.

4. The method for operating a computer system for the translation of telecommunications trouble tickets of claim 2, further comprising:
receiving a first close telecommunications trouble ticket instruction for the first enhanced telecommunications trouble ticket from the first telecommunications trouble ticket system;
translating the first close telecommunications trouble ticket instruction into a second close telecommunications trouble ticket instruction configured for the second enhanced telecommunications trouble ticket for the second telecommunications trouble ticket system; and
sending the second close telecommunications trouble ticket instruction for the second enhanced telecommunications trouble ticket to the second telecommunications trouble ticket system.

5. The method for operating a computer system for the translation of telecommunications trouble tickets of claim 2, further comprising:
receiving a first close telecommunications trouble ticket instruction for the first enhanced telecommunications trouble ticket from the second telecommunications trouble ticket system;
translating the first close telecommunications trouble ticket instruction into a second close telecommunications trouble ticket instruction configured for the first enhanced telecommunications trouble ticket for the first telecommunications trouble ticket system; and
sending the second close telecommunications trouble ticket instruction for the first enhanced telecommunications trouble ticket to the first telecommunications trouble ticket system.

6. The method for operating a computer system for the translation of telecommunications trouble tickets of claim 2, further comprising:
receiving a first modify telecommunications trouble ticket instruction for the first enhanced telecommunications trouble ticket from the first telecommunications trouble ticket system;
translating the first modify telecommunications trouble ticket instruction into a second modify telecommunications trouble ticket instruction configured for the second enhanced telecommunications trouble ticket for the second telecommunications trouble ticket system; and
sending the second modify telecommunications trouble ticket instruction for the second enhanced telecommunications trouble ticket to the second telecommunications trouble ticket system.

7. The method for operating a computer system for the translation of telecommunications trouble tickets of claim 2, further comprising:
receiving a first modify telecommunications trouble ticket instruction for the first enhanced telecommunications trouble ticket from the second telecommunications trouble ticket system;
translating the first modify telecommunications trouble ticket instruction into a second modify telecommunications trouble ticket instruction configured for the first enhanced telecommunications trouble ticket for the first telecommunications trouble ticket system; and
sending the second modify telecommunications trouble ticket instruction for the first enhanced telecommunications trouble ticket to the first telecommunications trouble ticket system.

8. A computer system comprising:
a storage system containing software and a database; and
a processing system coupled to the storage system;
wherein the processing system is instructed by the software to:
receive a native telecommunications trouble ticket, which includes information concerning a problem that occurred for a user of a telecommunications system, from a first telecommunications trouble ticket system;
translate the native telecommunications trouble ticket into a master telecommunications trouble ticket comprising additional data fields for other information in addition to the information from the native telecommunications trouble ticket;
store first data, which includes at least some of the information from the native telecommunications trouble ticket, in the database;
retrieve second data, which includes additional information related to the native telecommunications trouble ticket, from the database;
merge at least some of the second data into the master telecommunications trouble ticket comprising populating the additional data fields with the additional information retrieved from the second data;
translate the master telecommunications trouble ticket into a first enhanced telecommunications trouble ticket that includes the information from the native telecommunications trouble ticket and the additional information from the second data configured for use by the first telecommunications trouble ticket system; and
send the first enhanced telecommunications trouble ticket to the first telecommunications trouble ticket system.

9. The computer system of claim 8, wherein the processing system is further instructed by the software to:
select a second telecommunications trouble ticket system based on the native telecommunications trouble ticket;
translate the master telecommunications trouble ticket into a second enhanced telecommunications trouble ticket configured for use by the second telecommunications trouble ticket system; and
send the second enhanced telecommunications trouble ticket to the second telecommunications trouble ticket system.

10. The computer system of claim 9,
wherein the native telecommunications trouble ticket is in a first language; and
wherein to translate the master telecommunications trouble ticket into a second enhanced telecommunications trouble ticket, the processing system is instructed by the software to translate data from the master telecommunications trouble ticket in the first language into a second language.

11. The computer system of claim 9, wherein the processing system is further instructed by the software to:
receive a first close telecommunications trouble ticket instruction for the first enhanced telecommunications trouble ticket from the first telecommunications trouble ticket system;

translate the first close telecommunications trouble ticket instruction into a second close telecommunications trouble ticket instruction configured for the second enhanced telecommunications trouble ticket for the second telecommunications trouble ticket system; and send the second close telecommunications trouble ticket instruction for the second enhanced telecommunications trouble ticket to the second telecommunications trouble ticket system.

12. The computer system of claim 9, wherein the processing system is further instructed by the software to:

receive a first close telecommunications trouble ticket instruction for the first enhanced telecommunications trouble ticket from the second telecommunications trouble ticket system;

translate the first close telecommunications trouble ticket instruction into a second close telecommunications trouble ticket instruction configured for the first enhanced telecommunications trouble ticket for the first telecommunications trouble ticket system; and send the second close telecommunications trouble ticket instruction for the first enhanced telecommunications trouble ticket to the first telecommunications trouble ticket system.

13. The computer system of claim 9, wherein the processing system is further instructed by the software to:

receive a first modify telecommunications trouble ticket instruction for the first enhanced telecommunications trouble ticket from the first telecommunications trouble ticket system;

translate the first modify telecommunications trouble ticket instruction into a second modify telecommunications trouble ticket instruction configured for the second enhanced telecommunications trouble ticket for the second telecommunications trouble ticket system; and send the second modify telecommunications trouble ticket instruction for the second enhanced telecommunications trouble ticket to the second telecommunications trouble ticket system.

14. The computer system of claim 9, wherein the processing system is further instructed by the software to:

receive a first modify telecommunications trouble ticket instruction for the first enhanced telecommunications trouble ticket from the second telecommunications trouble ticket system;

translate the first modify telecommunications trouble ticket instruction into a second modify telecommunications trouble ticket instruction configured for the first enhanced telecommunications trouble ticket for the first telecommunications trouble ticket system; and send the second modify telecommunications trouble ticket instruction for the first enhanced telecommunications trouble ticket to the first telecommunications trouble ticket system.

15. A computer-readable medium having instructions stored thereon for operating a computer system, wherein the instructions, when executed by the computer system, direct the computer system to:

receive a native telecommunications trouble ticket, which includes information concerning a problem that occurred for a user of a telecommunications system, from a first telecommunications trouble ticket system;

translate the native telecommunications trouble ticket into a master telecommunications trouble ticket comprising additional data fields for other information in addition to the information from the native telecommunications trouble ticket;

store first data, which includes at least some of the information from the native telecommunications trouble ticket, in a database;

retrieve second data, which includes additional information related to the native telecommunications trouble ticket, from the database;

merge at least some of the data retrieved from the database into the master telecommunications trouble ticket comprising populating the additional data fields with the additional information retrieved from the second data;

translate the master telecommunications trouble ticket into a first enhanced telecommunications trouble ticket that includes the information from the native telecommunications trouble ticket and the additional information from the second data configured for use by the first telecommunications trouble ticket system; and send the first enhanced telecommunications trouble ticket to the first telecommunications trouble ticket system.

16. The computer-readable medium of claim 15, wherein the instructions, when executed by the computer system, further direct the computer system to:

select a second telecommunications trouble ticket system based on the first enhanced telecommunications trouble ticket;

translate the master telecommunications trouble ticket into a second enhanced telecommunications trouble ticket configured for use by the second telecommunications trouble ticket system; and send the second enhanced telecommunications trouble ticket to the second telecommunications trouble ticket system.

17. The computer-readable medium of claim 16, wherein the native telecommunications trouble ticket is in a first language; and wherein to translate the master telecommunications trouble ticket into a second enhanced telecommunications trouble ticket, the instructions, when executed by the computer system, further direct the computer system to translate data from the master telecommunications trouble ticket in the first language into a second language.

18. The computer-readable medium of claim 16, wherein the instructions, when executed by the computer system, further direct the computer system to:

receive a first close telecommunications trouble ticket instruction for the first enhanced telecommunications trouble ticket from the first telecommunications trouble ticket system;

translate the first close telecommunications trouble ticket instruction into a second close telecommunications trouble ticket instruction configured for the second enhanced telecommunications trouble ticket for the second telecommunications trouble ticket system; and send the second close telecommunications trouble ticket instruction for the second enhanced telecommunications trouble ticket to the second telecommunications trouble ticket system.

19. The computer-readable medium of claim 16, wherein the instructions, when executed by the computer system, further direct the computer system to:

receive a first close telecommunications trouble ticket instruction for the first enhanced telecommunications trouble ticket from the second telecommunications trouble ticket system;

translate the first close telecommunications trouble ticket instruction into a second close telecommunications trouble ticket instruction configured for the first enhanced telecommunications trouble ticket for the first telecommunications trouble ticket system; and send the second close telecommunications trouble ticket instruction for the first enhanced telecommunications trouble ticket to the first telecommunications trouble ticket system.

20. The computer-readable medium of claim 16, wherein the instructions, when executed by the computer system, further direct the computer system to:

receive a first modify telecommunications trouble ticket instruction for the first enhanced telecommunications trouble ticket from the first telecommunications trouble ticket system;

translate the first modify telecommunications trouble ticket instruction into a second modify telecommunications trouble ticket instruction configured for the second enhanced telecommunications trouble ticket for the second telecommunications trouble ticket system; and send the second modify telecommunications trouble ticket instruction for the second enhanced telecommunications trouble ticket to the second telecommunications trouble ticket system.

* * * * *